(12) United States Patent
Ness et al.

(10) Patent No.: US 11,881,743 B2
(45) Date of Patent: Jan. 23, 2024

(54) ROTOR ARRANGEMENT, ELECTRIC PROPULSION MOTOR ARRANGEMENT, VEHICLE, SET OF ROTORS FOR ELECTRIC MOTORS

(71) Applicant: Scania CV AB, Södertälje (SE)

(72) Inventors: Christian Ness, Nykvarn (SE); Stefan Karlsson, Skärholmen (SE); Christer Wallen, Södertälje (SE); Jörgen Forsberg, Mariefred (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/799,733

(22) PCT Filed: Feb. 11, 2021

(86) PCT No.: PCT/SE2021/050104
§ 371 (c)(1),
(2) Date: Aug. 15, 2022

(87) PCT Pub. No.: WO2021/173054
PCT Pub. Date: Sep. 2, 2021

(65) Prior Publication Data
US 2023/0076200 A1 Mar. 9, 2023

(30) Foreign Application Priority Data
Feb. 24, 2020 (SE) .................... 2050201-9

(51) Int. Cl.
*H02K 7/00* (2006.01)
*H02K 1/276* (2022.01)
*H02K 1/30* (2006.01)

(52) U.S. Cl.
CPC ........... *H02K 7/003* (2013.01); *H02K 1/2766* (2013.01); *H02K 1/30* (2013.01)

(58) Field of Classification Search
CPC ........ H02K 7/003; H02K 1/2766; H02K 1/30; H02K 1/28
(Continued)

(56) References Cited

U.S. PATENT DOCUMENTS

| 6,166,469 A | 12/2000 | Osama et al. |
| 2011/0227523 A1 | 9/2011 | Grantz |

(Continued)

FOREIGN PATENT DOCUMENTS

| DE | 102011012429 A1 | 8/2012 |
| DE | 202017100616 U1 | 2/2017 |

(Continued)

OTHER PUBLICATIONS

International Preliminary Report on Patentability—PCT/SE2021/050104—dated Aug. 30, 2022.
(Continued)

*Primary Examiner* — Terrance L Kenerly
(74) *Attorney, Agent, or Firm* — Banner & Witcoff, Ltd.

(57) ABSTRACT

A rotor arrangement for an electric motor is disclosed. The rotor arrangement comprises a first rotor comprising a hollow cylinder and a cylindrical rotor stack shrink-fitted onto the hollow cylinder. The first rotor comprises a first end plate attached to a first end portion of the hollow cylinder. The rotor arrangement further comprises a rotor shaft comprising a first shaft member and a second shaft member arranged coaxially to the first shaft member. The first shaft member is connected to a connection portion of the first end plate. The rotor arrangement comprises a second rotor connected to the second shaft member. The present disclosure further relates to an electric propulsion motor arrangement, a vehicle, and a set of rotors for electric motors.

14 Claims, 5 Drawing Sheets

(58) Field of Classification Search
USPC .......................................................... 310/75 R
See application file for complete search history.

(56) References Cited

U.S. PATENT DOCUMENTS

| 2019/0013759 A1 | 1/2019 | Bailey et al. |
| 2019/0103778 A1 | 4/2019 | Paul et al. |
| 2019/0393747 A1 | 12/2019 | Tang et al. |

FOREIGN PATENT DOCUMENTS

| DE | 102015216971 A1 | 3/2017 |
| DE | 102018200865 A1 | 7/2019 |

OTHER PUBLICATIONS

Oct. 8, 2020—(SE) Office Action—App. No. 2050201-9.
Jun. 27, 2019—(SE) Search Report—App. No. 2050201-9.
Mar. 5, 2021—(WO) International Search Report & Written Opinion—App. No. PCT/SE2021/050104.

ROTOR ARRANGEMENT, ELECTRIC PROPULSION MOTOR ARRANGEMENT, VEHICLE, SET OF ROTORS FOR ELECTRIC MOTORS

CROSS-REFERENCE TO RELATED APPLICATIONS

The present application claims priority from and is a U.S. National Phase of International Application No. PCT/SE2021/050104, which was filed on Feb. 11, 2021, designating the United States of America and claiming priority to Swedish Patent Application No. 2050201-9, filed on Feb. 24, 2020. This application claims priority to and the benefit of the above-identified applications, which are all fully incorporated by reference herein in their entireties.

TECHNICAL FIELD

The present disclosure relates to a rotor arrangement, an electric propulsion motor arrangement for a vehicle, a vehicle, a set of rotors for electric motors.

BACKGROUND

The use of electric drive for vehicles provides many advantages, especially regarding local emissions. Such vehicles comprise one or more electric motors configured to provide motive power to the vehicle. These types of vehicles can be divided into the categories pure electric vehicles and hybrid electric vehicles. Pure electric vehicles, sometimes referred to as battery electric vehicles, only-electric vehicles, and all-electric vehicles, comprise a pure electric powertrain and comprise no internal combustion engine and therefore produce no emissions in the place where they are used.

A hybrid electric vehicle comprises two or more distinct types of power, such as an internal combustion engine and an electric propulsion system. The combination of an internal combustion engine and an electric propulsion system provides advantages with regard to energy efficiency, partly because of the poor energy efficiency of an internal combustion engine at lower power output levels. Moreover, some hybrid electric vehicles are capable of operating in pure electric drive when wanted, such as when driving in certain areas.

An electric motor is an electrical machine that converts electrical energy into mechanical energy. Most electric motors comprise magnets and a wire winding, wherein the electric motor operate through the interaction between the magnetic field of the magnets and electric current in the wire winding to generate force in the form of rotation of a rotor of the electric motor. The rotor is surrounded by a stator. Some electric motors comprise magnets in the rotor and wire winding in the stator and some other electric motors comprise wire winding in the rotor and magnets in the stator.

Vehicles comes in different models, sizes, and the like, and consequently have different power and torque requirements. Moreover, different types of vehicles may have different transmission connections to the electric motor. Therefore, usually, electric motors having different performance usually need to be developed for different types of vehicles. Such development is usually costly and different components may need to be developed.

Moreover, an electric motor generates heat during operation. Therefore, it is an advantage if it can be ensured that the electric motor is sufficiently cooled in all operational conditions.

Furthermore, generally, on today's consumer market, it is an advantage if products, such as electric motors and their associated components, have conditions and/or characteristics suitable for being manufactured and assembled in a cost-efficient manner.

In addition, propulsion systems of vehicles are usually accommodated in confined spaces. Therefore, it is an advantage if the available space is utilized in an efficient manner.

Document DE102018200865A1 discloses a rotor for an electric machine comprising a sheet metal laminated core surrounding a cavity, a first end flange and a second end flange, the first end flange and the second end flange being arranged on the end face of the sheet metal laminated core in the axial direction of the rotor and being formed for mounting the rotor rotatably about its rotor axis.

Document DE102011012429A1 discloses a rotor shaft comprising a base portion formed as hollow cylinder and arranged between two side lids. The hollow cylinder is attached with bundles of lamination. The side lids are formed with continuous recesses. The side lids are connected with the hollow cylinder.

SUMMARY

It is an object of the present invention to overcome, or at least alleviate, at least some of the above-mentioned problems and drawbacks.

According to a first aspect of the invention, the object is achieved by a rotor arrangement for an electric motor, wherein the rotor arrangement comprises a first rotor, wherein the first rotor comprises a hollow cylinder, and a cylindrical rotor stack. The cylindrical rotor stack is shrink-fitted onto the hollow cylinder. The first rotor comprises a first end plate attached to a first end portion of the hollow cylinder. The rotor arrangement further comprises a rotor shaft comprising a first shaft member and a second shaft member arranged coaxially to the first shaft member. The first shaft member is connected to a connection portion of the first end plate of the first rotor. The rotor arrangement comprises a second rotor connected to the second shaft member.

Since the cylindrical rotor stack is shrink-fitted onto the hollow cylinder, a first rotor is provided having conditions and characteristics suitable for being adapted to different power and/or torque requirements in a simple and cost-efficient manner. That is, due to the features of the first rotor, the performance level of the first rotor can be adapted simply by selecting a length of the hollow cylinder and a length of the cylindrical rotor stack. Accordingly, a first rotor is provided having conditions and characteristics suitable for being adapted to different vehicles or different vehicle powertrains in a simple and cost-efficient manner.

Moreover, since the first rotor comprises the hollow cylinder and the cylindrical rotor stack shrink-fitted onto the hollow cylinder, a first rotor is provided having conditions for having a low weight. A low weight of the rotor is advantageous since the rotor will have a lower inertia and can thereby be accelerated faster.

Furthermore, since the first rotor comprises the hollow cylinder and the cylindrical rotor stack shrink-fitted onto the hollow cylinder, a first rotor is provided having conditions and characteristics suitable for being balanced in a simple and cost-efficient manner. That is, during manufacturing of a rotor for an electric motor, the rotor is preferably balanced so as to reduce vibration caused by the rotation of the rotor. Since the first rotor comprises the hollow cylinder and the cylindrical rotor stack shrink-fitted onto the hollow cylinder, at least the first rotor can be balanced in a simple and cost-efficient manner for example by machining a portion of the rotor, such as drilling a portion of the rotor, and/or by adding a weight to the rotor.

Moreover, since the first rotor comprises the hollow cylinder and the cylindrical rotor stack shrink-fitted onto the hollow cylinder, a first rotor is provided having conditions and characteristics suitable for being cooled in an efficient manner.

Moreover, since the first rotor comprises a first end plate attached to a first end portion of the hollow cylinder, a first rotor is provided comprising modular components having conditions and characteristics suitable for being adapted to different vehicles and different vehicle powertrains in a simple and cost-efficient manner.

Since the first end plate comprises a connection portion for connecting the first rotor to a rotor shaft, a first rotor is provided comprising modular components having conditions and characteristics suitable for being adapted to different vehicles, different vehicle powertrains, and different rotor shafts.

Since the rotor shaft comprises a first shaft member and a second shaft member arranged coaxially to the first shaft member, wherein the first shaft member is connected to the first rotor, and wherein the rotor arrangement comprises a second rotor connected to the second shaft member, a compact and efficient rotor arrangement can be provided. Moreover, the rotor arrangement provides conditions for obtaining gear changes of a gearbox with no loss in torque.

Furthermore, a rotor arrangement is provided comprising modular components having conditions and characteristics suitable for being adapted to different vehicles and different vehicle powertrains in a simple and cost-efficient manner. Moreover, a rotor arrangement is provided in which the hollow cylinder can be manufactured from one type of material, such as an aluminium alloy, and the first end plate can be manufactured from another type of material, such as a steel alloy. In this manner, a rotor can be provided having a low weight and inertia, while the durability of the rotor is ensured.

Furthermore, since the cylindrical rotor stack is shrink-fitted onto the hollow cylinder, a rotor arrangement is provided comprising a rigid and durable rotor.

Furthermore, since the first rotor comprises the hollow cylinder and the cylindrical rotor stack shrink-fitted onto the hollow cylinder, a rotor arrangement is provided in which the rotor can be balanced in a simple and cost-efficient manner as indicated above.

Moreover, since the first rotor comprises the hollow cylinder and the cylindrical rotor stack shrink-fitted onto the hollow cylinder, a rotor arrangement is provided having conditions and characteristics suitable for being cooled in an efficient manner.

Furthermore, since the first rotor of the rotor arrangement comprises the hollow cylinder and the cylindrical rotor stack shrink-fitted onto the hollow cylinder, a rotor arrangement is provided in which the hollow space inside the hollow cylinder can be utilized for accommodating components, systems, and/or arrangements. As an example, the hollow space inside the hollow cylinder can be utilized for accommodating a transmission component, a gear assembly, a shaft of another electric motor, a cooling system, or the like.

Accordingly, a rotor arrangement is provided overcoming, or at least alleviating, at least some of the above-mentioned problems and drawbacks. As a result, the above-mentioned object is achieved.

According to embodiments herein, the second rotor may comprise the same features, functions and advantages, as the first rotor, as is further explained herein.

Optionally, the first end plate has a larger outer diameter than the hollow cylinder. Thereby, a first rotor is provided in which the first end plate further can secure the cylindrical rotor stack relative to the hollow cylinder.

Optionally, the first rotor comprises a fluid cooling channel extending through at least a portion of the first end plate. Thereby, a first rotor is provided having conditions for being cooled in an efficient manner.

Optionally, the first rotor comprises a fluid cooling channel extending through at least a portion of the hollow cylinder. Thereby, a first rotor is provided having conditions for being cooled in an efficient manner.

Optionally, the first rotor of the rotor arrangement comprises a second end plate attached to a second end portion of the hollow cylinder. Thereby, a first rotor is provided comprising modular components having conditions and characteristics suitable for being adapted to different vehicles and different vehicle powertrains in a simple and cost-efficient manner. Moreover, a first rotor is provided in which the hollow cylinder can be manufactured from one type of material, such as an aluminium alloy, and the second end plate can be manufactured from another type of material, such as a steel alloy. In this manner, a first rotor can be provided having a low weight and inertia, while the durability of the first rotor is ensured.

Optionally, the second end plate comprises a support portion configured to accommodate a journal. Thereby, a first rotor is provided comprising modular components having conditions and characteristics suitable for being adapted to different vehicles, different vehicle powertrains, and different rotor shafts in a simple and cost-efficient manner.

Optionally, the first rotor comprises a fluid cooling channel extending through at least a portion of the second end plate. Thereby, a first rotor is provided having conditions for being cooled in an efficient manner.

Optionally, the first and second rotors of the rotor arrangement are rotors for an electric propulsion motor of a vehicle.

Optionally, the rotor arrangement comprises a first rotor comprising a fluid cooling channel extending through at least a portion of the first end plate, and wherein the fluid cooling channel extends through at least a portion of the rotor shaft. Thereby, the fluid cooling channel can be supplied with fluid, such as oil, a glycol-based coolant, or air, in a simple and efficient manner by feeding the fluid through the portion of the rotor shaft.

Optionally, the second shaft member extends through the hollow cylinder of the first rotor. Thereby, a compact and efficient rotor arrangement is provided. Moreover, the rotor arrangement provides conditions for obtaining gear changes of a gearbox with no loss in torque.

Optionally, the rotor arrangement comprises a fluid cooling channel extending through a first portion of the second shaft member, the first end plate, the hollow cylinder, and a second end plate of the first rotor into a second portion of the second shaft member and from the second portion of the second shaft member into a fluid cooling channel of the second rotor. Thereby, the respective fluid cooling channel can be supplied with fluid, such as oil, a glycol-based coolant, or air, in a simple and efficient manner by feeding the fluid through the portion of the rotor shaft. In this manner, sufficient cooling of the first rotor and the second rotor can be ensured in all operational conditions.

According to a third aspect of the invention, the object is achieved by an electric propulsion motor arrangement for a vehicle, wherein the electric propulsion motor arrangement comprises a rotor arrangement according to some embodiments of the present disclosure.

Thereby, an electric propulsion motor arrangement is provided having conditions and characteristics suitable for being adapted to different power and/or torque requirements in a simple and cost-efficient manner. That is, due to the features of the electric propulsion motor arrangement, the performance level of the rotor can be adapted simply by selecting a length of the hollow cylinder, a length of the cylindrical rotor stack, and a length of a stator of the electric propulsion motor arrangement. Accordingly, an electric propulsion motor arrangement is provided having conditions and characteristics suitable for being adapted to different vehicles or different vehicle powertrains in a simple and cost-efficient manner.

Furthermore, since the cylindrical rotor stack is shrink-fitted onto the hollow cylinder, an electric propulsion motor arrangement is provided comprising a rigid and durable rotor.

Moreover, since the electric propulsion motor arrangement comprises a first rotor with a hollow cylinder and a cylindrical rotor stack shrink-fitted onto the hollow cylinder, an electric propulsion motor arrangement is provided having conditions for having a low weight.

Moreover, since the electric propulsion motor arrangement comprises a first rotor with a hollow cylinder and a cylindrical rotor stack shrink-fitted onto the hollow cylinder, an electric propulsion motor arrangement is provided having conditions and characteristics suitable for being cooled in an efficient manner.

Furthermore, since the electric propulsion motor arrangement comprises a first rotor with a hollow cylinder and a cylindrical rotor stack shrink-fitted onto the hollow cylinder, an electric propulsion motor arrangement is provided in which the hollow space inside the hollow cylinder can be utilized for accommodating components, systems, and/or arrangements. As an example, the hollow space inside the hollow cylinder can be utilized for accommodating a transmission component, a gear assembly, a shaft of another electric motor, a cooling system, or the like.

Accordingly, an electric propulsion motor arrangement is provided overcoming, or at least alleviating, at least some of the above-mentioned problems and drawbacks. As a result, the above-mentioned object is achieved.

According to a fourth aspect of the invention, the object is achieved by a vehicle comprising an electric propulsion motor arrangement according to some embodiments of the present disclosure. Since the vehicle comprises an electric propulsion motor arrangement according to some embodiments, a vehicle is provided overcoming, or at least alleviating, at least some of the above-mentioned problems and drawbacks. As a result, the above-mentioned object is achieved.

According to a fifth aspect of the invention, the object is achieved by a set of rotors for electric motors, wherein the set of rotors comprises at least a first and a second rotor each comprising a hollow cylinder, and a cylindrical rotor stack. The first and second rotors are provided with identical measurements in a cross section perpendicular to a rotation axis of the respective first and second rotor. The second rotor comprises a hollow cylinder and a cylindrical rotor stack having a greater length measured in a direction of the rotation axis than the first rotor.

Thereby, a set of rotors is provided having conditions and characteristics suitable for being adapted to different power and/or torque requirements in a simple and cost-efficient manner. That is, due to the features of the rotor, the performance level of the rotor can be adapted simply by selecting a length of the hollow cylinder and a length of the cylindrical rotor stack. Accordingly, a set of rotors is provided having conditions and characteristics suitable for being adapted to different vehicles or different vehicle powertrains in a simple and cost-efficient manner.

Moreover, since each rotor comprises the hollow cylinder, a set of rotors is provided in which each rotor has conditions for having a low weight. A low weight of the rotor is advantageous since the rotor will have a lower inertia and can thereby be accelerated faster.

Furthermore, since each rotor comprises the hollow cylinder, a set of rotors is provided in which each rotor has conditions and characteristics suitable for being balanced in a simple and cost-efficient manner. That is, during manufacturing of a rotor for an electric motor, the rotor is preferably balanced so as to reduce vibration caused by the rotation of the rotor. Since each rotor comprises the hollow cylinder, the rotor can be balanced in a simple and cost-efficient manner for example by machining a portion of the rotor, such as drilling a portion of the rotor, and/or by adding a weight to the rotor.

Moreover, since each rotor comprises the hollow cylinder, a set of rotors is provided in which each rotor has conditions and characteristics suitable for being cooled in an efficient manner.

Furthermore, since each rotor comprises the hollow cylinder, a set of rotors is provided in which the hollow space inside the hollow cylinder of each rotor can be utilized for accommodating components, systems, and/or arrangements. As an example, the hollow space inside the hollow cylinder can be utilized for accommodating a transmission component, a gear assembly, a shaft of another electric motor, a cooling system, or the like.

Accordingly, a set of rotors is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout.

Well-known functions or constructions will not necessarily be described in detail for brevity and/or clarity.

Figure 1:
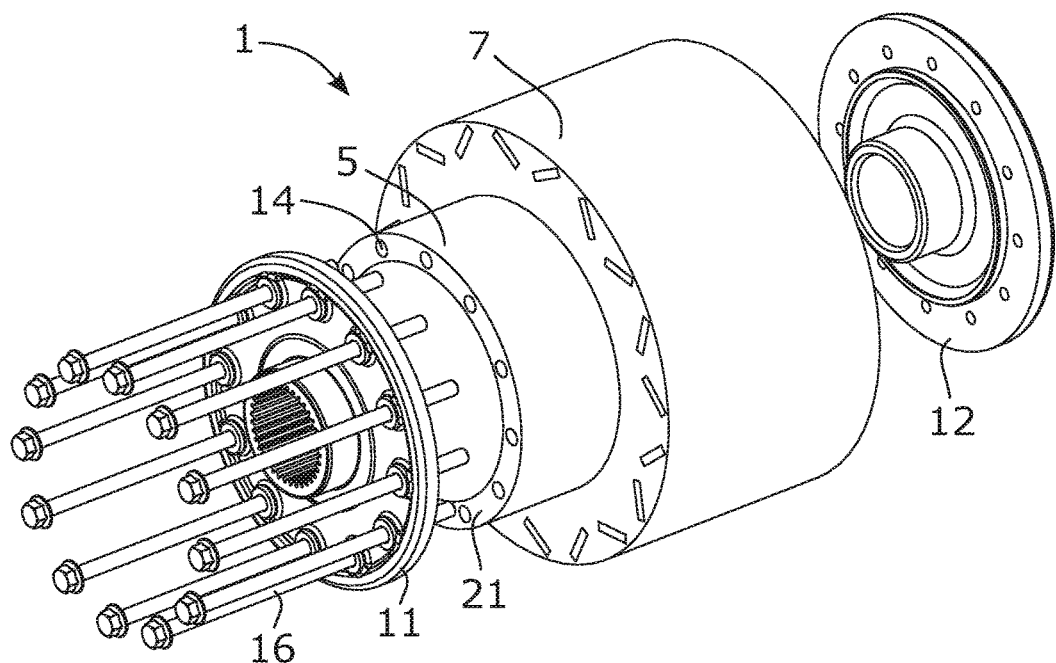
FIG. 1 illustrates a rotor according to some embodiments for an electric motor, wherein the rotor is in a partly disassembled state.

FIG. 1 illustrates a rotor 1 according to some embodiments for an electric motor, wherein the rotor 1 is in a partly disassembled state. The rotor 1 comprises a hollow cylinder 5 and a cylindrical rotor stack 7. The cylindrical rotor stack 7 comprises a set of axially spaced steel sheets and permanent magnets. According to the illustrated embodiments, the rotor 1 is a rotor 1 for an electric propulsion motor of a vehicle, as is further explained herein.

The rotor 1 further comprises a first end plate 11 and a second end plate 12. According to the illustrated embodiments, the first and second end plates 11, 12 are to be attached to a respective end portion 21 of the hollow cylinder 5. Moreover, according to the illustrated embodiments, the hollow cylinder 5 may comprise a number of through holes 14 each configured to receive a fastening element 16 so as to attach the respective first and second end plate 11, 12 to the hollow cylinder 5. Optionally, the first and second end plates 11, 12 may be attached to a respective end portion 21 of the hollow cylinder 5 by welding. According to embodiments herein, the cylindrical rotor stack 7 is to be shrink-fitted onto the hollow cylinder 5.

Figure 2:
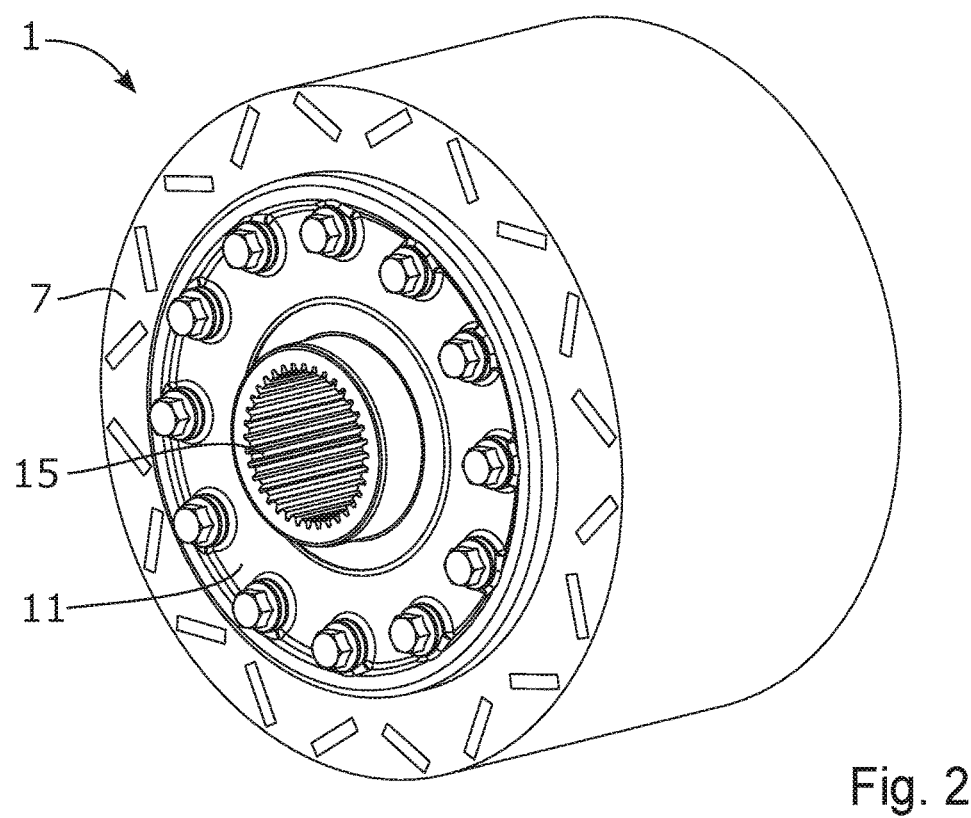
FIG. 2 illustrates the rotor illustrated in FIG. 1, wherein the rotor is in an assembled state.

FIG. 2 illustrates the rotor 1 illustrated in FIG. 1, wherein the rotor 1 is in an assembled state. That is, in relation to FIG. 1, the cylindrical rotor stack 7 has been shrink-fitted onto the hollow cylinder 5. Shrink-fitting is a process where a size change after assembly creates an interference fit. By heating and/or cooling one component prior to assembly and allowing it to return to the ambient temperature after assembly, the thermal expansion creates a joint.

Accordingly, in the process of shrink-fitting the cylindrical rotor stack 7 onto the hollow cylinder 5, the cylindrical rotor stack 7 may be heated and the hollow cylinder 5 may be cooled. The hollow cylinder 5 has a slightly larger outer diameter than an inner diameter of the cylindrical rotor stack 7 before such cooling/heating. The hollow cylinder 5 becomes slightly smaller when cooled and the cylindrical rotor stack 7 becomes slightly larger when heated. After cooling the hollow cylinder 5 and/or after heating the cylindrical rotor stack 7, the cylindrical rotor stack 7 may be axially displaced onto the hollow cylinder 5. Then, the cylindrical rotor stack 7 and the hollow cylinder 5 are allowed to return to ambient temperature, or to the same temperature. In this manner, a tight joint is obtained between the hollow cylinder 5 and the cylindrical rotor stack 7. Furthermore, since the cylindrical rotor stack 7 is shrink-fitted onto the hollow cylinder 5, a rigid and durable rotor 1 is provided.

Figure 3:
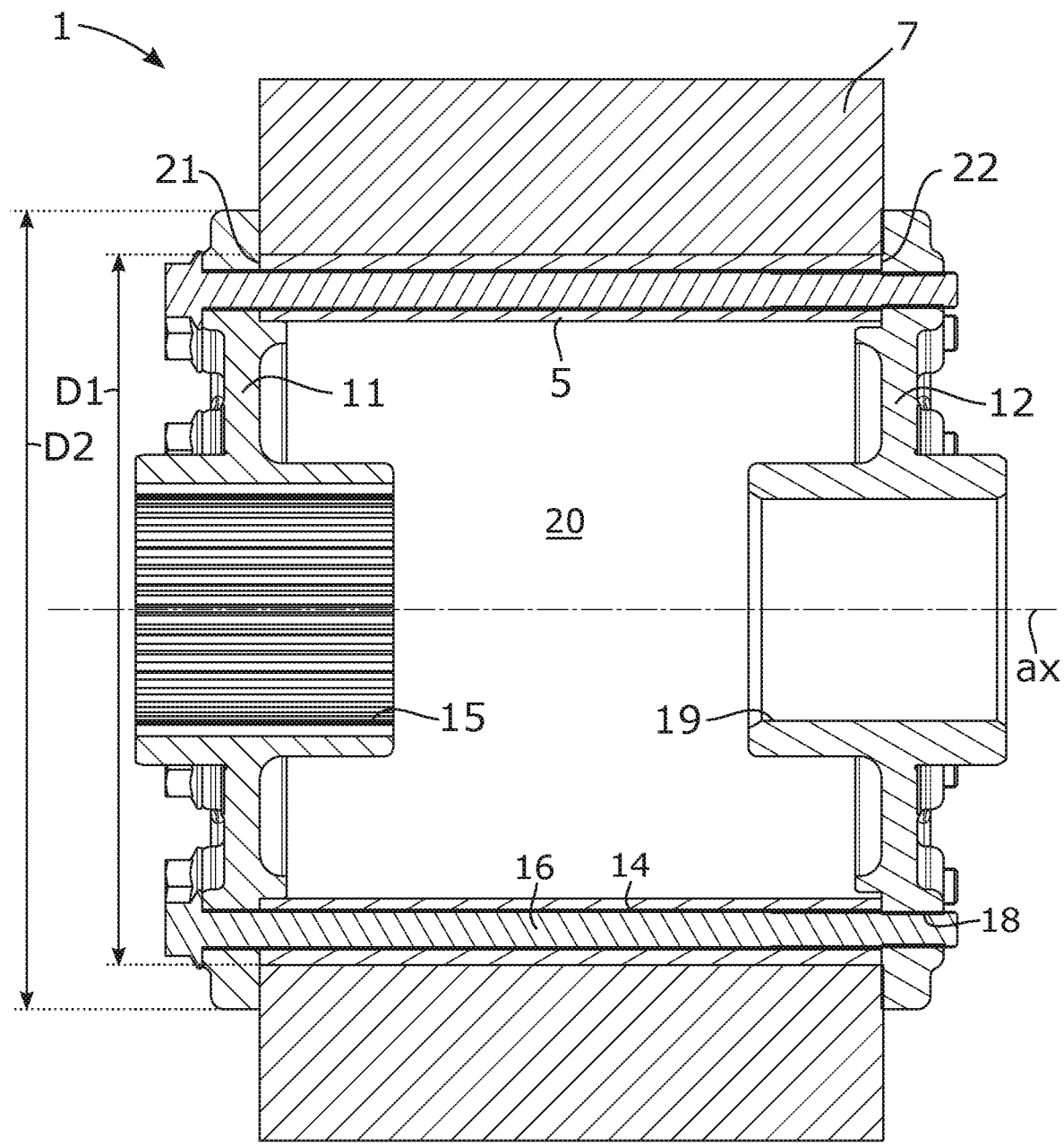
FIG. 3 illustrates a cross section through the rotor illustrated in FIG. 2.

FIG. 3 illustrates a cross section through the rotor 1 illustrated in FIG. 2. In FIG. 3, the cross section is made in a plane comprising a rotation axis ax of the rotor 1. As clearly seen in FIG. 3, the first end plate 11 is attached to a first end portion 21 of the hollow cylinder 5.

Moreover, the second end plate 12 is attached to a second end portion 22 of the hollow cylinder 5. According to the illustrated embodiments, the first and second end plates 11, 12 may be attached to the respective end portion 21, 22 by the fastening elements 16 extending through the through holes 14 of the hollow cylinder 5. Moreover, according to the illustrated embodiments, the rotor 1 comprises fastening elements 16 in the form of bolts. The second end plate 12 comprises threaded portions 18 configured to receive threads of the fastening elements 16. In this manner, a rotor 1 is provided which can be manufactured and assembled in a cost-efficient manner. According to further embodiments, the second end plate 12 may comprise through holes, wherein the first and second end plates 11, 12 are attached to respective end portion 21, 22 by applying a nut to treaded portions of the fastening elements 16. Alternatively the end plates 11, 12 may be welded to the end portions 21, 22 of the hollow cylinder 5.

Moreover, due to the features of the rotor 1, a rotor 1 is provided having conditions for having a low weight. A low weight of the rotor 1 is advantageous since the rotor 1 will have a lower inertia and can thereby be accelerated faster when arranged in an electric motor. Furthermore, since the rotor 1 comprises the hollow cylinder 5 and the cylindrical rotor stack 7 shrink-fitted onto the hollow cylinder 5, a rotor 1 is provided having conditions and characteristics suitable for being balanced in a simple and cost-efficient manner. The rotor 1 can be balanced in a simple and cost-efficient manner for example by machining a portion of the rotor 1, such as drilling a portion of the rotor 1, and/or by adding a weight to a portion of the rotor 1.

Moreover, since the rotor 1 comprises the hollow cylinder 5 and the cylindrical rotor 1 stack shrink-fitted onto the hollow cylinder 5, a rotor 1 is provided having conditions and characteristics suitable for being cooled in an efficient manner, as is further explained herein. Furthermore, since the rotor 1 comprises the hollow cylinder 5 and the cylindrical rotor stack 7 shrink-fitted onto the hollow cylinder 5, a rotor 1 is provided in which the hollow space 20 inside the hollow cylinder 5 can be utilized for accommodating components, systems, and/or arrangements. As an example, the hollow space 20 inside the hollow cylinder 5 can be utilized for accommodating a transmission component, a transmission, a gear assembly, a shaft of another electric motor, a cooling system, or the like.

As indicated in FIG. 3 and FIG. 2, the first end plate 11 comprises a connection portion 15 for connecting the rotor 1 to a rotor shaft, as is further explained herein. According to the illustrated embodiments, the connecting portion 15 comprises splines. Moreover, as is indicated in FIG. 3, the second end plate 12 comprises a support portion 19. The support portion 19 configured to accommodate a journal, as is further explained herein. The support portion 19 may comprise a bearing surface, a bearing, a seat, or the like.

Since the rotor 1 comprises the hollow cylinder 5 and the first and second end plates 11, 12, a modular system is provided in which one or both of the first and second end plates 11, 12 can made in different versions with different interfaces 15, 19, such as different spline interfaces 15 or different support interfaces 19. In this manner, a rotor 1 is provided comprising modular components 5, 11, 12 having conditions and characteristics suitable for being adapted to different vehicles and different vehicle powertrains in a simple and cost-efficient manner. The hollow cylinder 5 can be manufactured from one type of material, such as an aluminium alloy, and the first and second end plates 11, 12 can be manufactured from another type of material, such as a steel alloy. In this manner, a rotor 1 is provided having a low weight and inertia, while the durability of the rotor 1 is ensured.

As can be seen in FIG. 3, the first and second end plates 11, 12 each has a larger outer diameter D2 than an outer diameter D1 of the hollow cylinder 5. In this manner, the first and second end plates 11, 12 further secure the cylindrical rotor stack 7 onto the hollow cylinder 5 in axial directions of the rotor 1, i.e. in directions coinciding with the rotation axis ax of the rotor 1.

Figure 4:
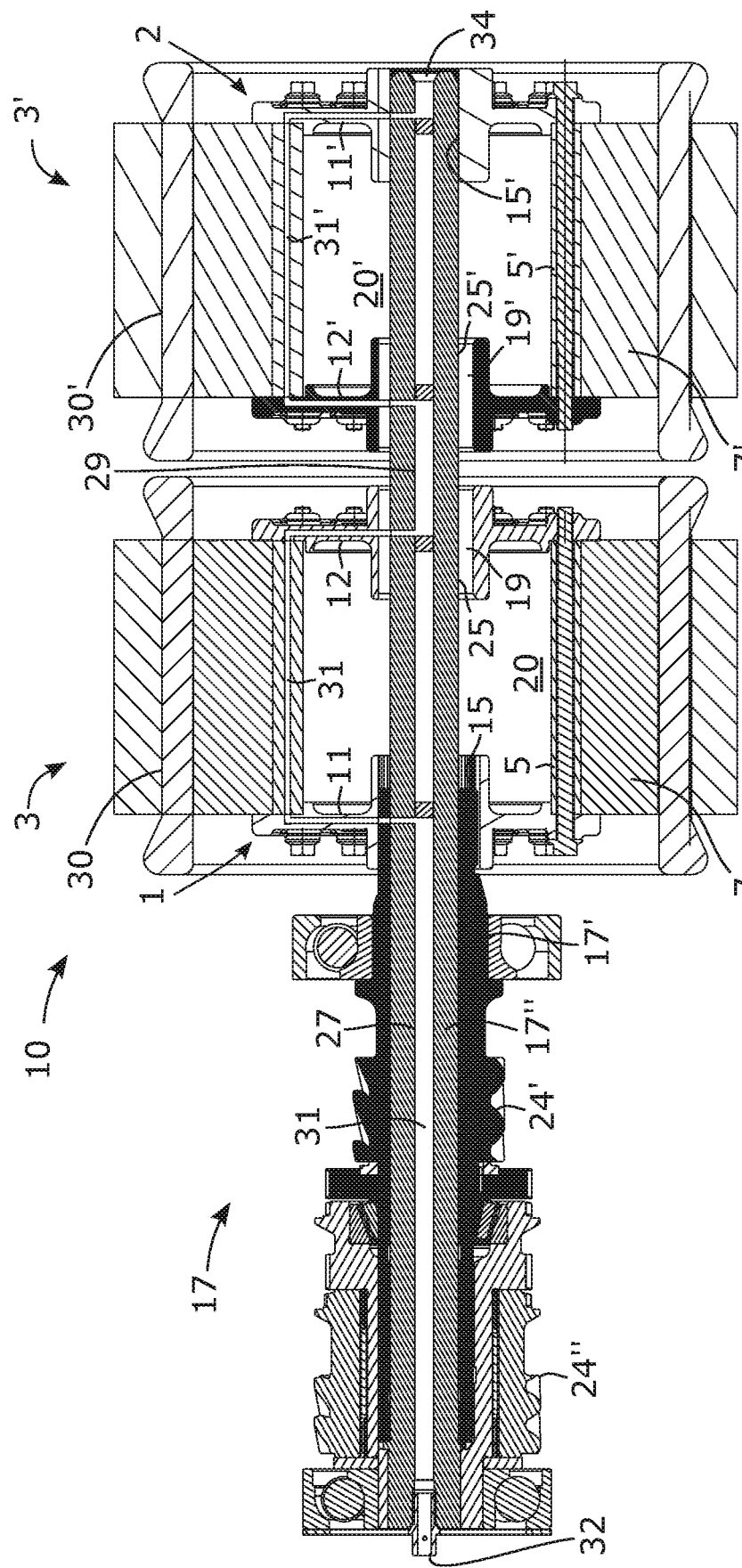
FIG. 4 illustrates an electric propulsion motor arrangement according to some embodiments.

FIG. 4 illustrates an electric propulsion motor arrangement 3, 3' according to some embodiments for a vehicle. The electric propulsion motor arrangement 3, 3' comprises a rotor 1 according to the embodiments explained with reference to FIG. 1-FIG. 3. Moreover, the electric propulsion motor arrangement 3, 3' comprises a second rotor 2. The second rotor 2 comprises the same features, functions, and advantages, as the rotor 1 explained with reference to FIG. 1-FIG. 3 with some differences explained below. Since the electric propulsion motor arrangement 3, 3' comprises two rotors 1, 2, the "rotor 1" referred to herein may also be referred to as a "first rotor 1". The electric propulsion motor arrangement 3, 3' further comprises a rotor shaft 17. In some places herein, the rotor shaft 17, the rotor 1 and the second rotor 2 are referred to as a rotor arrangement 10.

The rotor shaft 17 comprises a first shaft member 17' and a second shaft member 17" arranged coaxially to the first shaft member 17'. The first shaft member 17' and the second shaft member 17" can rotate independently of each other. The first shaft member 17' comprises a first gear connection interface 24' and the second shaft member 17" comprises a second gear connection interface 24". Each of the first and second gear connection interfaces 24', 24" is configured to accommodate a gear for connection to a gearbox. The first shaft member 17' is connected to the rotor 1. That is, the first shaft member 17' is connected to the connecting portion 15 of the first end plate 11 of the rotor 1. In this manner, the first shaft member 17' is rotationally locked to the rotor 1. As seen in FIG. 4, the second shaft member 17" extends through the hollow cylinder 5 of the rotor 1, i.e. extends through the hollow space 20 of the hollow cylinder 5 of the rotor 1. Moreover, as seen in FIG. 4, the support portion 19 of the second end plate 12 of the rotor 1 accommodates a journal 25 of the second shaft member 17".

The second rotor 2 is connected to the second shaft member 17". That is, the second shaft member 17" is connected to a connecting portion 15' of a first end plate 11' of the second rotor 2. In this manner, the second shaft member 17" is rotationally locked to the second rotor 2. As seen in FIG. 4, the second shaft member 17" extends through the hollow cylinder 5' of the second rotor 2, i.e. extends through the hollow space 20' of the hollow cylinder 5' of the second rotor 2. Moreover, as seen in FIG. 4, a support portion 19' of a second end plate 12' of the second rotor 2 accommodates a journal 25' of the second shaft member 17".

Furthermore, as can be seen in FIG. 4, the first shaft member 17' has a greater outer diameter than the second shaft member 17". Therefore, the first end plate 11 of the rotor 1 comprises a connecting portion 15 with greater inner diameter than the connection portion 15' of the first end plate 11' of the second rotor 2. According to the illustrated embodiments, the second end plates 12, 12' of the rotor 1 and the second rotor 2 may be of identical design.

The electric propulsion motor arrangement 3, 3' further comprises a first stator assembly 30 and a second stator assembly 30'. The rotor 1 is arranged inside the first stator assembly 30 so as to form a first electric motor 3. The second rotor 2 is arranged inside the second stator assembly 30' so as to form a second electric motor 3'. The first stator assembly 30 and the second stator assembly 30' each comprises wire windings. During operation, an electric current is supplied to the wire windings to generate a magnetic field interacting with the magnetic fields of the cylindrical rotor stacks 7, 7' of the respective rotor 1, 2 so as to rotate the respective rotor 1, 2.

The rotor arrangement 10 comprises a fluid cooling channel 31. According to the illustrated embodiments, the fluid cooling channel 31 is configured to receive a liquid coolant, such as oil or a glycol based coolant. According to further embodiments, the fluid cooling channel 31 may be configured to receive a gaseous fluid, such as air. As seen in FIG. 4, according to the illustrated embodiments, the fluid cooling channel 31 extends through a first portion 27 of the second shaft member 17". Moreover, the fluid cooling channel 31 comprises an inlet 32 at a first end of the second shaft member 17". The fluid cooling channel 31 extends into the first end plate 11, the hollow cylinder 5, and the second end plate 12 of the rotor 1 into a second portion 29 of the second shaft member 17". That is, according to the illustrated embodiments, each of the first end plate 11, the hollow cylinder 5, and the second end plate 12 of the rotor 1 comprises a section of the fluid cooling channel 31. Moreover, the fluid cooling channel 31 extends from the second portion 29 of the second shaft member 17" into a fluid cooling channel 31' of the second rotor 2. That is, according to the illustrated embodiments, each of the second end plate 12', the hollow cylinder 5', and the first end plate 11' of the second rotor 2 comprises a section of the fluid cooling channel 31'. In this manner, a continuous fluid cooling channel 31, 31' is formed through the rotor arrangement 10. The fluid cooling channel 31, 31' has an outlet 34 at a second end of the second shaft member 17". In this manner, a fluid, such as oil, can be pumped from the inlet 32 to the outlet 34 of the fluid cooling channel 31, 31' so as to cool the respective rotor 1, 2 in an efficient manner.

Figure 5:
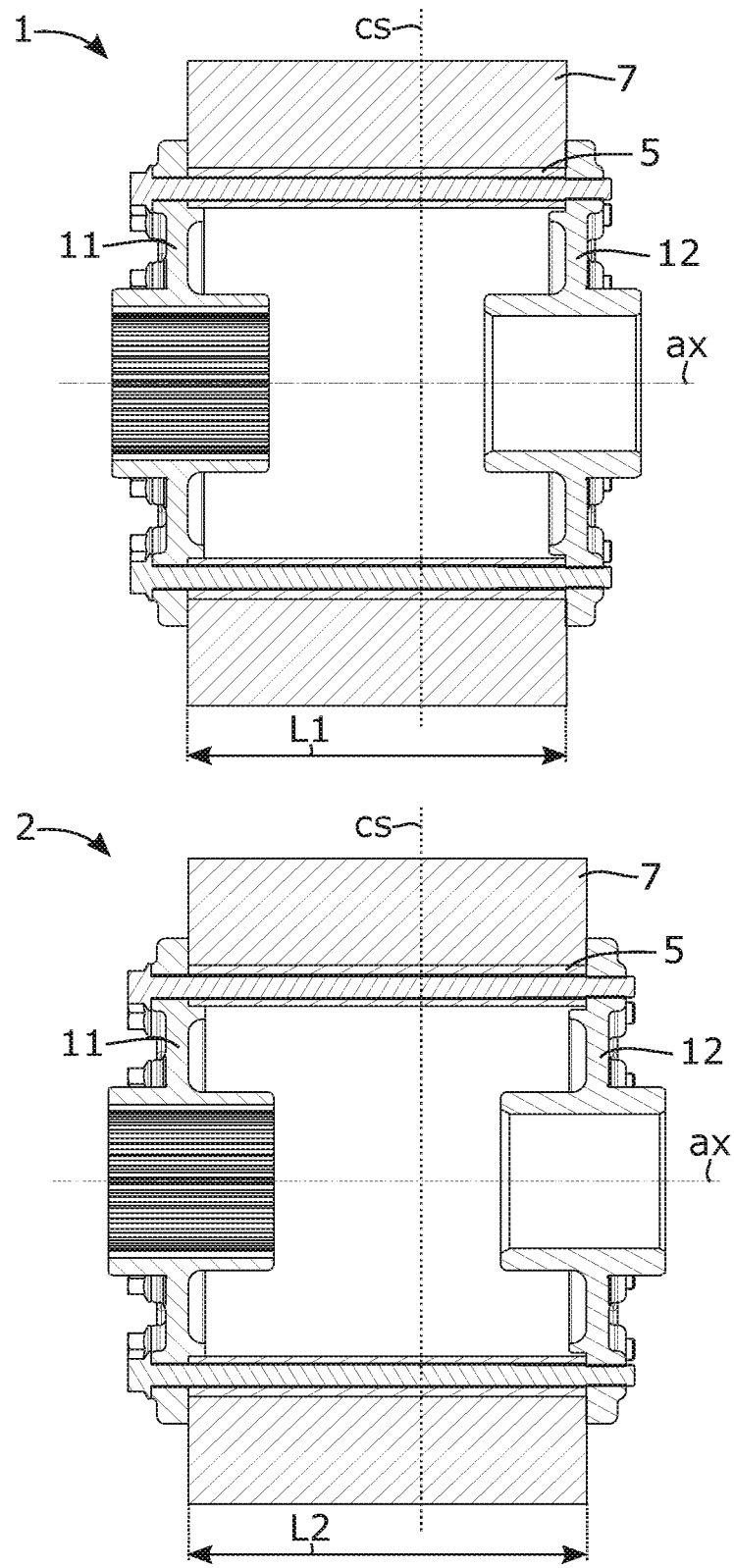
FIG. 5 illustrates a cross section of a set of rotors according to some embodiments for electric motors.

FIG. 5 illustrates a cross section of a set of rotors 1, 2 according to some embodiments for electric motors. The set of rotors 1, 2 comprises at least a first rotor 1 and at least a second rotor 2. In FIG. 5, the cross section is made in a plane comprising a respective rotation axis ax of the respective rotor 1, 2. Each of the first and second rotor 1, 2 comprises a hollow cylinder 5 and a cylindrical rotor stack 7. The cylindrical rotor stack 7 may be shrink fitted onto the hollow cylinder 5 of the respective rotor 1, 2. The first and second rotors 1, 2 are provided with identical measurements in a cross section cs perpendicular to a rotation axis ax of the respective first and second rotor 1, 2. That is, the hollow cylinder 5 of the first and second rotors 1, 2 are provided with identical measurements, such as inner and outer radius, in the cross section cs perpendicular to the rotation axis ax of the respective first and second rotor 1, 2. Likewise, the cylindrical rotor stack 7 of the first and second rotors 1, 2 are provided with identical measurements, such as inner and outer radius, in the cross section cs perpendicular to the rotation axis ax of the respective first and second rotor 1, 2. However, the second rotor 2 comprises a hollow cylinder 5 and a cylindrical rotor stack 7 having a greater length L2 measured in a direction of the rotation axis ax than the length L1 of the hollow cylinder 5 and the cylindrical rotor stack 7 of the first rotor 1.

Thereby, a set of rotors 1, 2 is provided having conditions and characteristics suitable for being adapted to different power and/or torque requirements in a simple and cost-efficient manner. That is, due to the features of the rotor 1 explained herein, the performance level of the rotor 1 can be adapted simply by selecting a length L1, L2 of the hollow cylinder 5 and a length L1, L2 of the cylindrical rotor stack 7. Accordingly, a set of rotors 1, 2 is provided having conditions and characteristics suitable for being adapted to different vehicles or different vehicle powertrains in a simple and cost-efficient manner.

Figure 6:
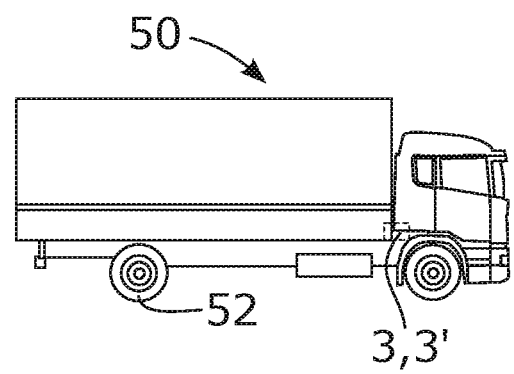
FIG. 6 illustrates a vehicle according to some embodiments.

FIG. 6 illustrates a vehicle 50 according to some embodiments. The vehicle 50 comprises an electric propulsion motor arrangement 3, 3' according to the embodiments illustrated in FIG. 4. The electric propulsion motor arrangement 3, 3' is configured to provide motive power to the vehicle 50 via wheels 52 of the vehicle 50. According to the illustrated embodiments, the vehicle 50 is a truck. However, according to further embodiments, the vehicle 50, as referred to herein, may be another type of manned or unmanned vehicle for land or water based propulsion such as a lorry, a bus, a construction vehicle, a tractor, a car, a ship, a boat, or the like. Moreover, according to the illustrated embodiments, the vehicle 50 is a fully electric vehicle. However, according to further embodiments, the vehicle 50, as referred to herein, may be a hybrid electric vehicle also comprising a combustion engine.

Figure 7:
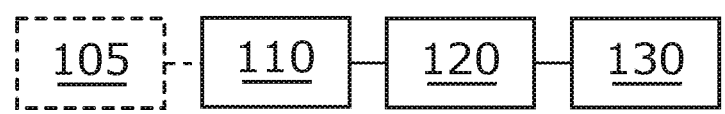
FIG. 7 illustrates a method of providing a rotor for an electric motor according to some embodiments.

FIG. 7 illustrates a method 100 of providing a rotor for an electric motor according to some embodiments. The rotor may be a rotor 1, 2 as explained with reference to FIG. 1-FIG. 5.

Therefore, below, simultaneous reference is made to FIG. 1-FIG. 5 and FIG. 7. The method 100 is a method 100 of providing a rotor 1, 2 for an electric motor 3, 3', wherein the method 100 comprises the steps of:

providing 110 a hollow cylinder 5, 5',
providing 120 a cylindrical rotor stack 7, 7', and
shrinking 130 the cylindrical rotor stack 7, 7' onto the hollow cylinder 5, 5'.

Since the method 100 comprises the steps of providing 110 the hollow cylinder 5, 5' and providing the cylindrical rotor stack 7, 7', the method 100 provides conditions for adapting the performance level of the rotor 1, 2 to different power and/or torque requirements in a simple and cost-efficient manner. That is, the performance level of the rotor 1, 2 can be adapted simply by selecting a length L1, L2 of the hollow cylinder 5, 5' and a length L1, L2 of the cylindrical rotor stack 7, 7'. Accordingly, a method 100 is provided having conditions and characteristics suitable for being adapted to different vehicles or different vehicle powertrains in a simple and cost-efficient manner.

Furthermore, since the method 100 comprises the step of shrinking the cylindrical rotor stack 7, 7' onto the hollow cylinder 5, 5', a method 100 is provided resulting in a rigid and durable rotor 1, 2.

Moreover, since the method 100 comprises the step of shrinking the cylindrical rotor stack 7, 7' onto the hollow cylinder 5, 5', a method 100 is provided resulting in a rotor 1, 2 having conditions for a low weight. A low weight of the rotor 1, 2 is advantageous since the rotor 1, 2 will have a lower inertia and can thereby be accelerated faster.

Furthermore, since the method 100 comprises the step of shrinking the cylindrical rotor stack 7, 7' onto the hollow cylinder 5, 5', a method 100 is provided resulting in a rotor 1, 2 having conditions and characteristics suitable for being balanced in a simple and cost-efficient manner. That is, during manufacturing of a rotor 1, 2 for an electric motor, the rotor 1, 2 is preferably balanced so as to reduce vibration caused by the rotation of the rotor 1, 2. Since the rotor 1, 2 comprises the hollow cylinder 5, 5' and the cylindrical rotor stack 7, 7' shrink-fitted onto the hollow cylinder 5, 5', the rotor 1, 2 can be balanced in a simple and cost-efficient manner for example by machining a portion of the rotor 1, 2, such as drilling a portion of the rotor 1, 2, and/or by adding a weight to the rotor 1, 2.

Moreover, since the method 100 comprises the step of shrinking the cylindrical rotor stack 7, 7' onto the hollow cylinder 5, 5', a method 100 is provided resulting in a rotor 1, 2 having conditions and characteristics suitable for being cooled in an efficient manner.

Furthermore, since the method 100 comprises the step of shrinking the cylindrical rotor stack 7, 7' onto the hollow cylinder 5, 5', a method 100 is provided resulting in a rotor 1, 2 in which the hollow space 20, 20' inside the hollow cylinder 5, 5' can be utilized for accommodating components, systems, and/or arrangements. As an example, the hollow space 20, 20' inside the hollow cylinder 5, 5' can be utilized for accommodating a transmission component, a gear assembly, a shaft of another electric motor, a cooling system, or the like.

As indicated in FIG. 7, the method 100 may comprise the steps of:

selecting 105 a length L1, L2 of the hollow cylinder 5, 5' and of the cylindrical rotor stack 7, 7' so as to select a performance level of the rotor 1, 2.

Thereby, the method 100 provides conditions for adapting the performance level of the rotor 1, 2 to different power and/or torque requirements in a simple and cost-efficient manner. Accordingly, a method 100 is provided having conditions and characteristics suitable for being adapted to different vehicles or different vehicle powertrains in a simple and cost-efficient manner.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A rotor arrangement for an electric motor, wherein the rotor arrangement comprises a first rotor, wherein the first rotor comprises:
a hollow cylinder, and
a cylindrical rotor stack,
and wherein the cylindrical rotor stack is shrink-fitted onto the hollow cylinder,
wherein the first rotor comprises a first end plate attached to a first end portion of the hollow cylinder,
characterized in that the rotor arrangement further comprises a rotor shaft comprising a first shaft member and a second shaft member arranged coaxially to the first shaft member,
wherein the first shaft member is connected to a connection portion of the first end plate of the first rotor, and
wherein the rotor arrangement comprises a second rotor connected to the second shaft member.

2. The rotor arrangement according to claim 1, wherein the first end plate has a larger outer diameter than the hollow cylinder.

3. The rotor arrangement according to claim 1, wherein the first rotor comprises a fluid cooling channel extending through at least a portion of the first end plate.

4. The rotor arrangement according to claim 1, wherein the first rotor comprises a fluid cooling channel extending through at least a portion of the hollow cylinder.

5. The rotor arrangement according to claim 1, wherein the first rotor comprises a second end plate attached to a second end portion of the hollow cylinder.

6. The rotor arrangement according to claim 5, wherein the second end plate comprises a support portion configured to accommodate a journal.

7. The rotor arrangement according to claim 5, wherein the first rotor comprises a fluid cooling channel extending through at least a portion of the second end plate.

8. The rotor arrangement according to claim 1, wherein the first and second rotors of the rotor arrangement are rotors for an electric propulsion motor of a vehicle.

9. The rotor arrangement according to claim 1, wherein the rotor arrangement comprises a first rotor according to comprising a fluid cooling channel extending through at least a portion of the first end plate, and wherein the fluid cooling channel extends through at least a portion of the rotor shaft.

10. The rotor arrangement according to claim 1, wherein the second shaft member extends through the hollow cylinder of the first rotor.

11. The rotor arrangement according to claim 1, wherein the rotor arrangement comprises a fluid cooling channel extending through a first portion of the second shaft member, the first end plate, the hollow cylinder, and a second end plate of the first rotor into a second portion of the second shaft member and from the second portion of the second shaft member into a fluid cooling channel of the second rotor.

12. An electric propulsion motor arrangement, wherein the electric propulsion motor arrangement comprises a rotor arrangement according to claim 1.

13. The electric propulsion motor arrangement according to claim 12, wherein the electric propulsion motor arrangement is in a vehicle.

14. A set of rotors for electric motors, wherein the set of rotors comprises at least a first and a second rotor each comprising:
- a hollow cylinder, and
- a cylindrical rotor stack,
  wherein the first and second rotors are provided with identical measurements in a cross section (cs) perpendicular to a rotation axis (ax) of the respective first and second rotor,
- and wherein the second rotor comprises a hollow cylinder and a cylindrical rotor stack having a greater length measured in a direction of the rotation axis (ax) than the first rotor.

* * * * *